United States Patent
Izawa (12)

(10) Patent No.: US 6,229,263 B1
(45) Date of Patent: May 8, 2001

(54) LIGHTING-DIRECTION CONTROL UNIT FOR VEHICLE LAMP

(75) Inventor: Makoto Izawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/488,349

(22) Filed: Jan. 20, 2000

(30) Foreign Application Priority Data

Jan. 22, 1999 (JP) .................................................. 11-014167

(51) Int. Cl.$^7$ ....................................................... B60Q 1/26
(52) U.S. Cl. .................................................. 315/80; 701/49
(58) Field of Search .................................. 315/80, 77, 78, 315/79, 82; 307/10.8, 10.1; 701/49, 36, 37, 48; 250/208.1, 214 AL

(56) References Cited

U.S. PATENT DOCUMENTS 5,787,370 * 7/1998 Kutscher et al. ....................... 701/49
5,907,196 * 5/1999 Hayami et al. ....................... 307/10.8
6,049,171 * 4/2000 Stam et al. ............................... 315/82

* cited by examiner

Primary Examiner—Don Wong
Assistant Examiner—Chuc D Tran
(74) Attorney, Agent, or Firm—Fish & Richardson P.C.

(57) ABSTRACT

A lighting-direction control unit 1 for a lamp of a vehicle incorporates a vehicle-height detecting means 2 for detecting change in the height of an axle of front wheels or that of rear wheel of the vehicle. In response to a signal representing the detected height of the vehicle, the pitch angle of the vehicle is obtained to change the lighting direction of a lamp 6 to correspond to the change in the attitude of the vehicle. A means 3 for detecting the change rate of acceleration for obtaining the change rate of acceleration with respect to time in the direction in which the vehicle runs is provided. When the change rate with respect to time is high, a lighting control means 4 transmits a control signal to an operating means 5 in such a manner that the response of the control of the lighting direction of the lamp 6 is quickened. Therefore, delay in the control is prevented when the change in the acceleration is great.

11 Claims, 8 Drawing Sheets

LIGHTING-DIRECTION CONTROL UNIT FOR VEHICLE LAMP

BACKGROUND OF THE INVENTION

The present invention relates to an apparatus which detects changes in the height of an axle of a front wheel and/or an axle of a rear wheel of a vehicle so as to control the lighting direction of a vehicle lamp in accordance with change in the attitude of the vehicle.

An apparatus (a so-called "automatic leveling apparatus") is known which performs automatic correction in such a manner that a predetermined lighting direction of lamps (headlights) provided for a vehicle is always maintained if the attitude of running of the vehicle is changed.

An automatic leveling apparatus has a structure that, for example, a vehicle-height sensor is provided for each of front wheels and rear wheels of a vehicle or either of the front wheels or the rear wheels the vehicle. The foregoing automatic leveling apparatus is arranged to cause the vehicle-height sensor to measure change in the pitch angle (or the pitching angle) of the vehicle to move reflecting mirrors in the headlights to cancel the foregoing change so as to control the lighting direction of the lamp or the height of the cut line of a light distribution pattern of the low beam. Thus, glare (light) caused from change in the attitude of the vehicle can be prevented.

The conventional apparatus is arranged to change the response of the control to correspond to the degree of acceleration of the vehicle. Thus, control is quickly performed when the acceleration is large and the control is slowly performed when the acceleration is small.

The velocity of change of the pitch angle of the vehicle is not changed to correspond to the degree of the acceleration. The foregoing velocity is changed in proportion to the change rate of the acceleration with respect to time. Therefore, if quick change in the acceleration occurs in a state in which the acceleration is slow, delay in the control takes place. If light which is more upward than a horizontal plane is unnecessary emitted as dazzling light, there is apprehension that glare occurs.

SUMMARY OF THE INVENTION

Accordingly, an object of the present invention is to reduce frequency of occurrence of dazzling light caused from determination of the response of control of the lighting direction of a lamp for a vehicle with the degree of the acceleration so as to appropriately control the lighting direction of the lamp if the pitch angle of the vehicle is changed.

To solve the above-mentioned problems, according to the present invention, there is provided a lighting-direction control unit for a lamp for a vehicle structured to detect change in the height of an axle of a front wheel and/or an axle of a rear wheel of a vehicle to change a lighting direction of a lamp in accordance with change in the attitude of the vehicle, the lighting-direction control unit for a lamp for a vehicle comprising: lighting control means for obtaining a change rate of acceleration in a direction in which the vehicle runs with respect to time to change a control response of the lighting direction of the lamp in accordance with the degree of the change rate.

Therefore, according to the present invention, the control response of the lighting direction is changed in accordance with the change rate of the acceleration in the direction in which the vehicle runs with respect to time. Thus, a problem (glare) which arises when the response of the control is determined can be prevented.

BRIEF DESCRIPTION OF THE DRAWINGS

FIG. 3 is a block diagram showing an example of the structure of the apparatus;

FIGS. 4 to 6 are flow charts of an example of the control procedure and FIG. 4 shows a first portion of the flow chart;

FIG. 5 shows an intermediate portion of the process;

FIG. 6 shows a final portion of the process;

FIG. 7 is a graph showing an example of modes of the control; and

FIG. 8 is a schematic graph showing a state of control.

DETAILED DESCRIPTION OF THE PREFERRED EMBODIMENTS

Figure 1:
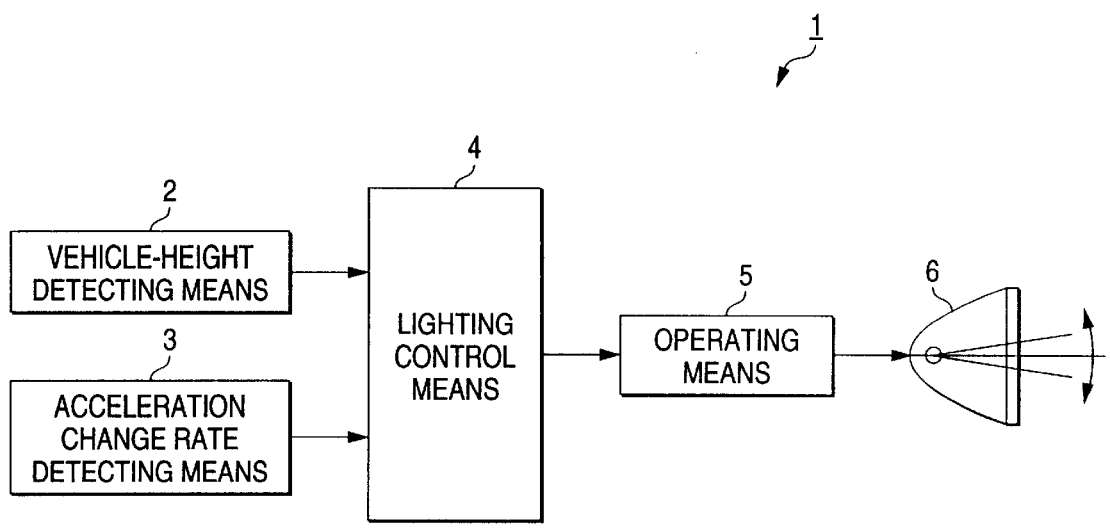
FIG. 1 is a block diagram showing the basic structure of the present invention.

FIG. 1 shows the basic structure of an apparatus according to the present invention. The apparatus is structured to detect change in the height of the axle of front wheel and/or axle of rear wheel of a vehicle so as to change the lighting direction of a lamp in accordance with change in the attitude of the vehicle.

A lighting-direction control unit 1 incorporates a vehicle-height detecting means 2; a means 3 for detecting the change rate of acceleration for detecting the change rate of the acceleration of the running vehicle with respect to time; lighting control means 4; and an operating means 5. In response to a signal representing the detected vehicle height and supplied from the vehicle-height detecting means 2, the lighting-direction control unit 1 obtains a pitch angle (or a pitching angle) of the vehicle so as to change the lighting direction of a lamp 6 in accordance with change in the attitude in the longitudinal direction of the vehicle. The lamp 6, the lighting direction of which is controlled by the lighting control means 4 through the operating means 5, is exemplified by a head lamp, a fog lamp and a cornering lamp in a case of a lamp for a vehicle.

The vehicle-height detecting means 2 is provided for the axle of the front wheel and/or the axle of the rear wheel of the vehicle to detect change in the height of the vehicle. A signal representing the detected vehicle height is basic information from which the attitude of the stopped vehicle and the attitude of the running vehicle are obtained. A method of detecting the vehicle height may be a method with which the distance between the vehicle-height detecting means 2 and the surface of the road is measured by using a detecting wave, such as an ultrasonic wave or a laser beam. Another method may be employed with which a vehicle-height sensor serving as the vehicle-height detecting means 2 is provided which detects vertical change of the axle of the front wheels or rear wheels to detect an amount of expansion/contraction of the suspension. Any method which is capable of detecting change in the attitude of the vehicle in the direction in which the vehicle runs may be employed.

The means 3 for detecting the change rate of acceleration is required to obtain the change rate of the acceleration in the direction in which the vehicle runs with respect to time. Information about the change rate with respect to time is transmitted to the following lighting control means 4 so as to be used as basic information for determining the response of the control of the lighting direction of the lamp 6.

A method of calculating the change rate of acceleration with respect to time is exemplified by the following method.

(1) A method with which the foregoing change rate is directly obtained from information (the velocity or the acceleration) indicating a state of running of the vehicle.

(2) A method which uses indirect information obtained as change in the attitude of the vehicle.

The method (1) include a method with which an acceleration sensor for detecting the acceleration of the vehicle in the direction in which the vehicle runs is provided for the vehicle to obtain time differentiation (first order differentiation) value of a detection signal (a signal indicating the value of acceleration) of the sensor. Another method may be employed which obtains a second order differentiation value of a vehicle velocity signal obtained by a velocity sensor in terms of time. The latter method has an advantage in that the conventional velocity sensor can be used.

The method (2) is exemplified by a method with which an acceleration sensor joined to the axle is operated to calculate the change rate of the attitude of the vehicle with respect to time in the direction in which the vehicle runs. Another method may be employed with which an angular velocity sensor (for example, a gyro sensor) for detecting change in the pitch angle of the vehicle is provided for the vehicle to obtain the rate of change in the pitch angle in accordance with information obtained from the foregoing sensor.

Moreover, a method may be employed which uses any one of a variety of detecting means for analyzing the attitude of running of the vehicle or a means for detecting information (for example, force applied to an accelerator pedal or a brake pedal) about the driving operation of a driver. That is, any one of a variety of methods adaptable to the employed detected means may be employed. From a viewpoint of simplifying the structure and prevention of excessive enlargement of the cost, it is preferable that the foregoing method is employed. That is, it is preferable that the method is employed with which the detecting means for detecting change in the acceleration of the vehicle in the direction in which the vehicle runs or change in the attitude of the running vehicle is provided to calculate the change rate of the acceleration with respect to time or change rate of the attitude of the running vehicle with respect to time so as to change the response of the control of the lighting direction of the lamp.

The lighting control means 4 is supplied with the detection signals from the vehicle-height detecting means 2 and the means 3 for detecting the change rate of acceleration to perform the following control.

(A) Correction of the lighting direction in accordance with change in the pitch angle of the vehicle.

(B) Determination of the response of control of the lighting direction in accordance with the change rate of acceleration with respect to time.

The control (A) is performed by obtaining change in the pitch angle corresponding to change in the attitude of the vehicle to correct the lighting direction of the lamp to cancel the foregoing change. That is, if the front portion of the vehicle is changed to somewhat face upwards (or downwards), the lighting direction of the lamps provided for the front portion of the vehicle is undesirably made to face somewhat upwards (or downwards) as compared with a horizontal plane. Therefore, modification to cause the lighting direction to be downwards (or upwards) is performed to make the foregoing direction to always face a predetermined direction.

The control (B) is control which is an essential portion of the present invention. That is, when the change rate of acceleration with respect to time is high, the response of the control is quickened. When the change rate of acceleration with respect to time is low, the response of the control is slowed (for example, the proportional relationship is determined between the two factors).

The response may be determined by, for example, a method with which time (sampling time) required to obtain data which is necessary to calculate the change rate of acceleration with respect to time, detection time (time to determine a period of time for which average values are calculated) which is the subject of an averaging operation or the like is changed. Another method may be employed with which the duty cycle or the like of the control signal which is transmitted to the operating means 5 is changed. The present invention is not limited to the determining methods. Therefore, any one of known methods may be employed.

The control of the response may be performed by a method with which the response is continuously changed or a method with which a threshold value is determined to perform change in a stepped manner. In the former case, relational equations and/or a data table for determining the response of the control of the change rate of acceleration with respect to time is previously prepared. In accordance with the equations or the data table, control is performed in such a manner that the response of the control is quickened as the change rate of acceleration with respect to time is raised. In the latter case, the change rate of acceleration with respect to time or an amount of change corresponding to the foregoing change rate is compared with a predetermined threshold value. In accordance with a result of the comparison, the response is determined.

The method (1) may be performed such that the quantity of the second order differentiation of the change rate of acceleration obtained from the acceleration sensor with respect to time or the velocity obtained by the velocity sensor in terms of time is obtained. When the obtained value is larger than a threshold value (a reference value for the determination), the response is obtained to quickly change the lighting direction of the lamp. The method (2) may be performed such that the change rate of the attitude of the vehicle with respect to time or the velocity of change in the pitch angle of the vehicle is obtained. When the obtained value is larger than a threshold value (a reference value for the determination), the response is obtained to quickly change the lighting direction of the lamp.

When driving information of the driver is used, the following method may be employed: in accordance with information about the operation of the accelerator or the brake pedal, whether or not shift from an acceleration state of the vehicle to the deceleration state or inverse shift from the deceleration state to the acceleration state is completed in a short time is used as a reference for the determination. Time required to complete the shift is compared with a threshold value. If required time is short, control is switched to quicken the response so as to quickly change the lighting direction of the lamp.

In response to the control signal transmitted from the lighting control means 4 to the operating means 5, control of the lighting direction of the lamp 6 is performed. The control is performed by a method with which the overall portion of irradiation light is caused to direct a predetermined direction or a method with which a portion of irradiation light is directed to a predetermined direction. The former method is exemplified by a method with which the overall body of the lamp is rotated around its rotational shaft to change the direction of the irradiation axis of the lamp. Another method may be employed with which the attitude of the element of the lamp, for example, the reflecting mirror, the lens, the light source, the light shielding member or the like is controlled to change the direction of the optical axis of the optical system. The latter method is exemplified by a method with which the irradiation axis of a specific lamp of an apparatus incorporating a plurality of lamps is changed to partially change the irradiation direction (for example, the irradiation axis of only one or two lamps of three lamps, which are a head lamp a fog lamp and a cornering lamp, provided for an automobile, is changed). Another method may be employed with which the attitude of one or a plurality of elements of the lamp is controlled (for example, the reflecting mirror is composed of a fixed reflecting mirror and a movable reflecting mirror and the optical axis of the movable reflecting mirror is directed to a required direction).

Thus, according to the present invention, if rapid acceleration or deceleration of the running vehicle is performed, the response of the control of the lighting direction of the lamp can appropriately be changed in accordance with the change rate of acceleration with respect to time in the direction of running. Thus, the effect of control to prevent dazzling light which causes glare can significantly be improved.

FIGS. 2 to 8 are diagrams showing an embodiment in which the present invention is applied to a lighting-direction control unit for a lamp for a vehicle (an automatic leveling apparatus).

Figure 2:
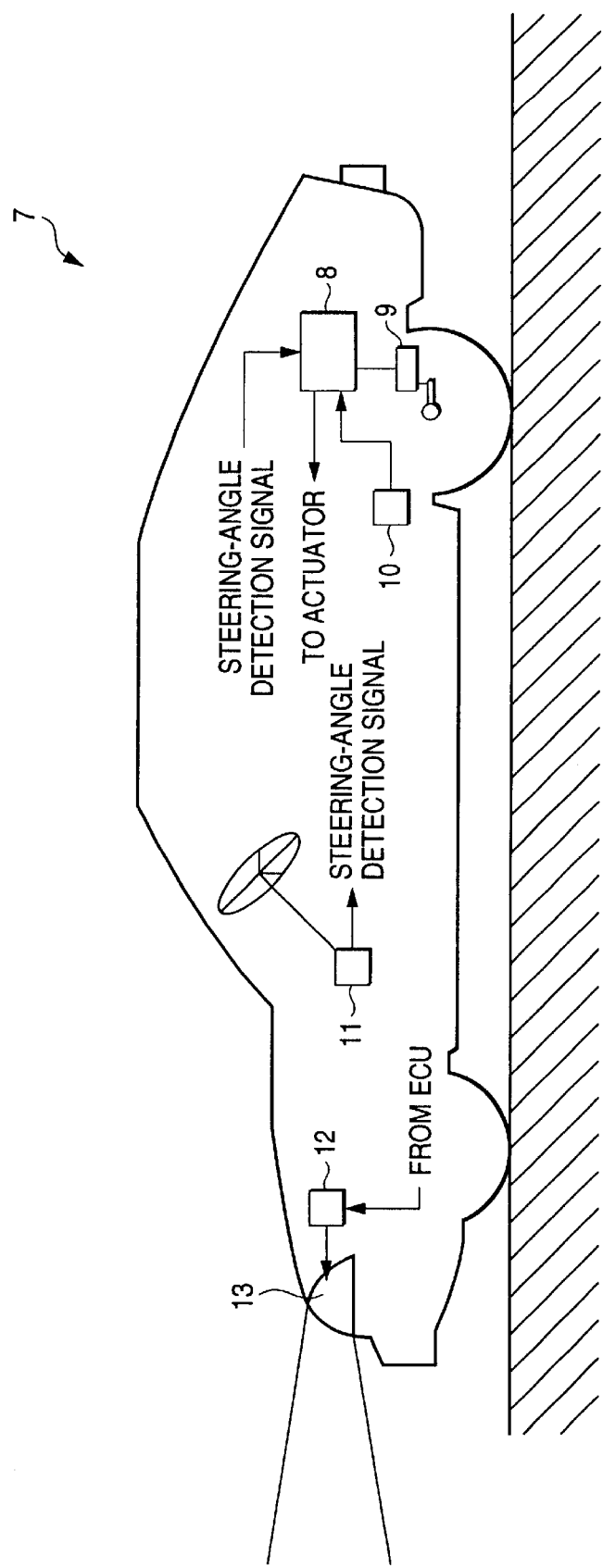
FIGS. 2 and 3 to 8 show an example of the embodiment of the present invention and FIG. 3 is a diagram showing an example of the layout of an automatic leveling apparatus for an automobile.

FIG. 2 schematically shows an example of the layout of the lighting-direction control unit 7 in the vehicle. An ECU (an electronic control unit) 8 which is a controller for the lighting-direction control unit 7 is disposed in the rear portion of the vehicle. A detection signal from each of a vehicle-height sensor 9, a vehicle-velocity sensor 10 and a steering sensor 11 is supplied to the ECU 8.

The vehicle-height sensor 9 corresponding to the foregoing vehicle-height detecting means 2 is provided for the left rear wheels of an automobile, the vehicle-height sensor 9 being a sensor provided for an electronic control air suspension for the rear wheel. The vehicle-velocity sensor (the vehicle velocity detecting means) 10 is a sensor for an ABS (Anti-skid Brake System) provided for the rear wheel. The steering sensor 11 is provided for detecting the steering angle of the steering wheel.

A signal for controlling the ECU 8 is transmitted to an actuator portion 12 so that the lighting direction of a head lamp 13 is performed (note that FIG. 2 shows only the left-hand actuator and head lamp).

In this embodiment, only one vehicle-height sensor 9 is provided for the rear wheel. In accordance with data about the detected vehicle height, the attitude of the vehicle is detected (in response to a detection signal supplied from the vehicle height sensor, the stopping attitude of the vehicle is calculated and the relationship between the attitude of the running vehicle and the detection signal from the vehicle height sensor is previously determined so that the attitude of running of the vehicle is obtained). As a matter of course, also the vehicle height sensor may be provided for the axle of the front wheels to detect the attitude of the vehicle in accordance with data of a plurality of detected heights.

Figure 3:
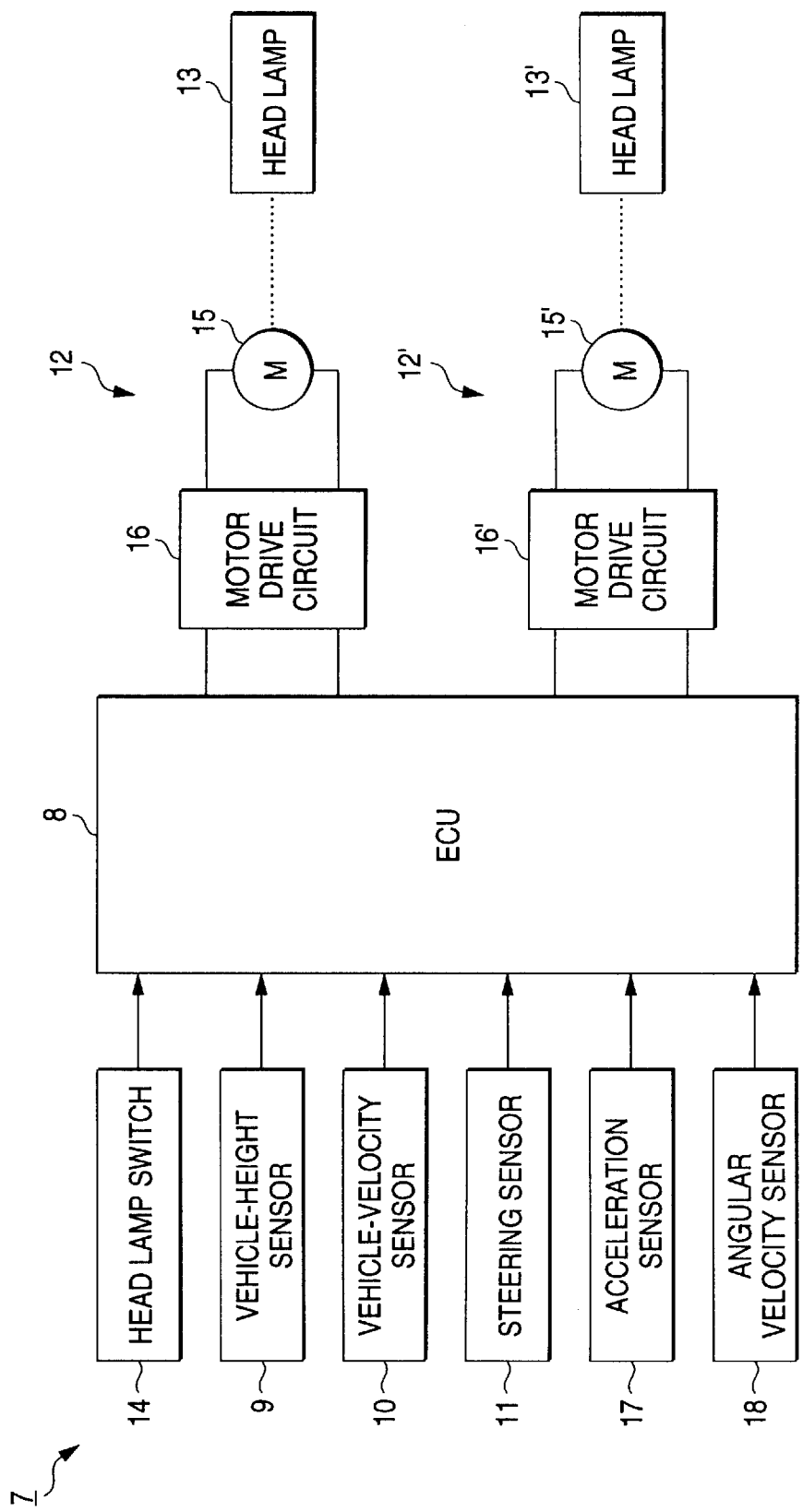

FIG. 3 shows the structure of the lighting-direction control unit 7. The ECU 8 including a microcomputer is supplied with an instruction signal to turn on/off the head lamp from a head-lamp switch 14 and detection signals from the foregoing vehicle-height sensor 9, the vehicle-velocity sensor 10 and the steering sensor 11.

The actuator portion 12 (12') corresponding to the operating means 5 incorporates a motor drive circuit 16 for controlling the rotation of a stepping motor 15 (15') in response to a control supplied from the ECU 8. The actuator portion 12' is provided to correspond to a head lamp 13' disposed in the right-hand portion of the vehicle, the actuator portion 12' having a stepping motor 15' and a motor drive circuit 16'.

The actuator portion 12 (12') is individually controlled in such a manner that the lighting of the corresponding head lamp faces a required direction by inclining the reflecting mirror in the head lamp 13 (13') with respect to a vertical plane including its optical axis. Thus, the height of the cut line (or the cut-off) for determining the boundary of the low beam distribution between a bright portion and a dark portion can be changed.

Figure 4:
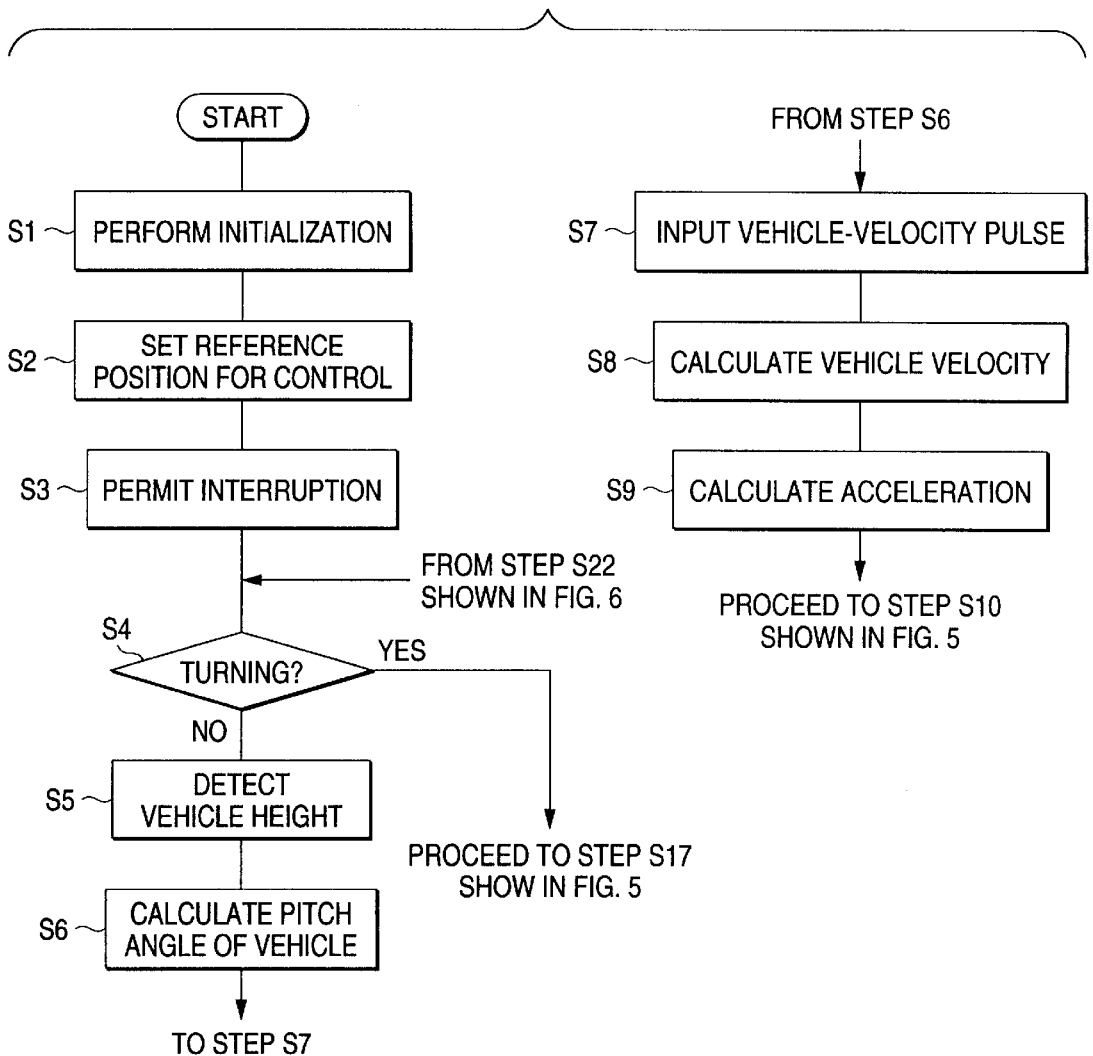
Figure 5:
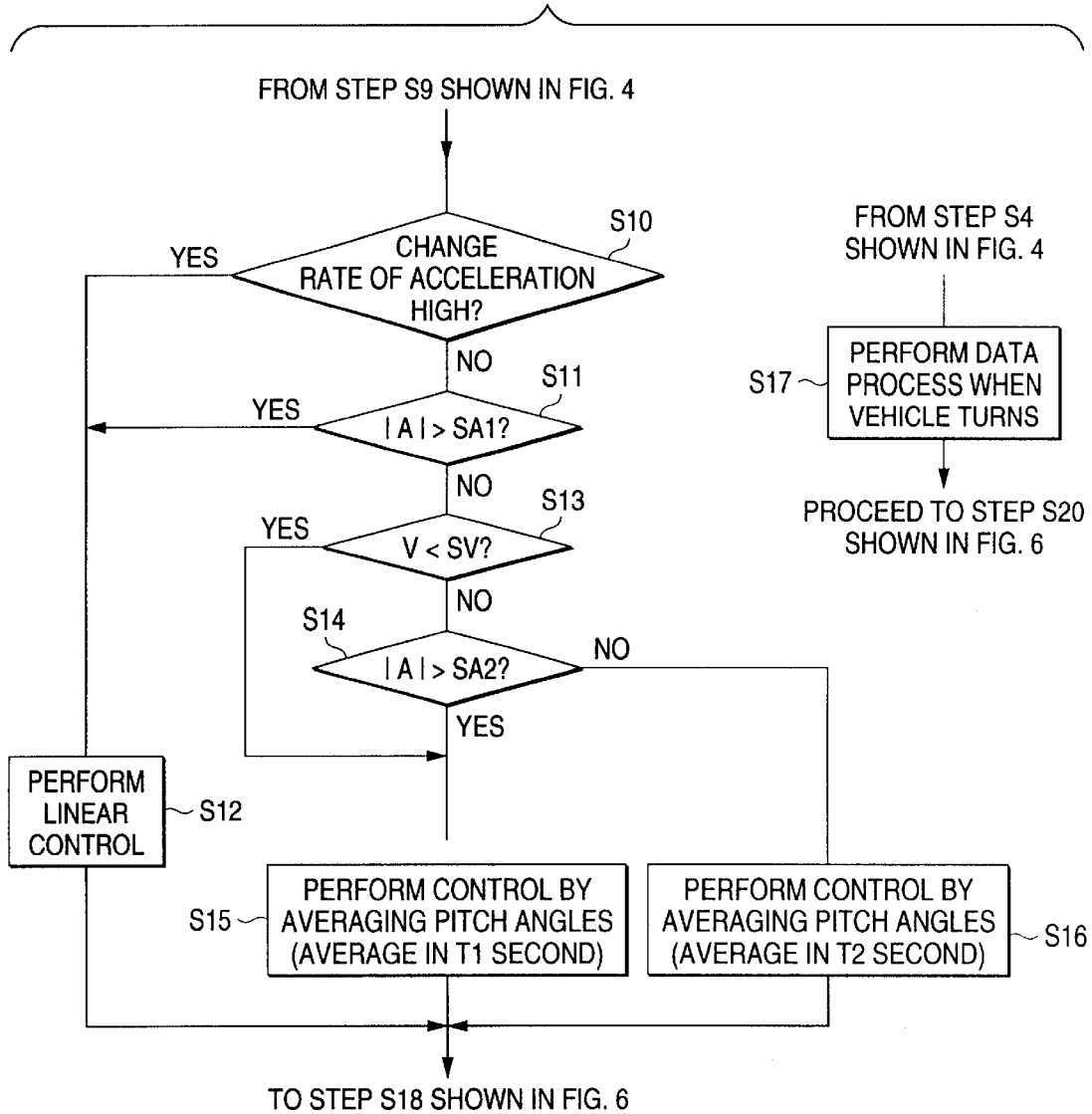
Figure 6:
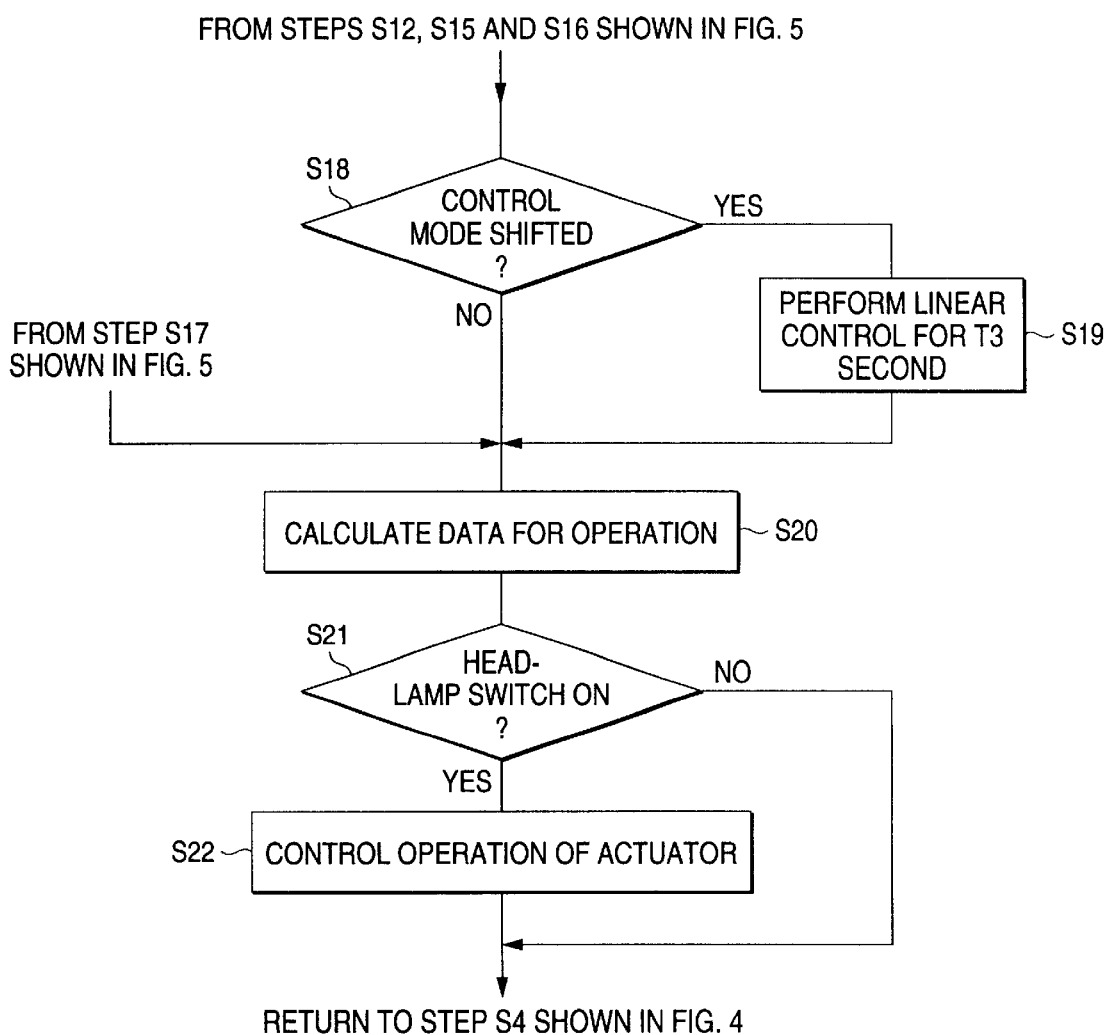

FIGS. 4 to 6 are flow charts showing a main process which is performed by the ECU 8. In step S1 shown in FIG. 4, an I/O (input/output) port and a memory are initialized. Then, a control reference position is determined in step S2, that is, the initial positions of the actuator portions 12 and 12' are determined.

Then, the operation proceeds to step S3 so that interruption of timer of the CPU (Central Processing Unit) in the ECU 8 is permitted. In step S4 whether or not the wheels are being rotated is determined in response to a detection signal supplied from the steering sensor 11. If the wheels are rotated, the operation proceeds to step S17 shown in FIG. 5. If a negative determination is made, the operation proceeds to next step S5.

In step S5 the height of the vehicle is detected. That is, a vehicle-height detection signal obtained from the vehicle-height sensor 9 is received by the ECU 8.

In step S6 the pitch angle of the vehicle is calculated in response to the vehicle-height detection signal. Then, the detection signal (a pulse signal) supplied from the vehicle-velocity sensor 10 is, in step S7, supplied to the ECU 8. Note that the foregoing process is an interruption process.

In step S8 the vehicle velocity (which is expressed as "V") is obtained by a calculation for obtaining the same. In step S9 the acceleration (which is expressed as "A") is calculated by performing differentiation operation. Then, the operation process to step S10 shown in FIG. 5. The acceleration can easily be obtained by dividing the amount of change in the velocity with time required to complete the change.

In step S10 whether or not the change rate of the acceleration of the vehicle with respect to time is high is determined by making a comparison with its threshold value. If the change rate of acceleration with respect to time is high, the operation proceeds to step S12 so that linear control (obtained vehicle-height detection data is directly used to correct the lighting direction of the head lamp without performing a filtering process of the obtained vehicle-height detection data) is performed. If the change rate of acceleration with respect to time is low, the operation proceeds to step S11.

In step S11, whether or not the magnitude $|A|$ of the acceleration A obtained in step S9 is larger than its threshold value SA1 (for example, SA1=3 m/s$^2$ to 5 m/s$^2$) is determined. If an affirmative determination is made, the operation proceeds to step S12. If $|A| \leq SA1$, the operation proceeds to step S13.

In step S13 whether or not the vehicle velocity V obtained in step S18 is lower than its threshold value SV (for example, SV=1 km/h to 3 km/h) (that is, the vehicle is being substantially stopped) is determined. If an affirmative determination is made, the operation proceeds to step S15. It |V|≧SV, the operation proceeds to step S14.

In step S14 whether or not the magnitude |A| of the acceleration A is larger than its threshold value SA2 (SA2<SA1, for example, SA2=1 m/s² to 2 m/s²) is determined. If an affirmative determination is made, the operation proceeds to step S15. If A≦SA2, the operation proceeds to step S16.

In step S15 a predetermined time average, for example, an average value of the pitch angle in, for example, T1=1 second is calculated. Then, control data corresponding to the average value is obtained.

In step S16 a predetermined time average, for example, an average value of the pitch angle in, for example, T2=5 seconds (that is, a time average in time T2>T1 which is longer than the time employed in step S15) is calculated. Then, control data corresponding to the average value is obtained.

When a state of turning of the vehicle has been detected in step S4 shown in FIG. 4, the operation proceeds to step S17 shown in FIG. 5 so that a data process which must be performed when a vehicle is being turned is performed. The reason for this will now be described. If the pitch angle of the vehicle obtained from the detection signal supplied from the vehicle-height sensor 9 when the vehicle is being turned is employed as it is to control the lighting direction of the lamp, there sometimes arises a problem. If the height of the vehicle in the rear left wheel portion is enlarged when the vehicle is being turned to the left in a state in which the vehicle-height sensor is joined to only the rear left wheel of the vehicle, the lighting direction of the lamp is undesirably controlled to an upward direction from a horizontal plane. To prevent the above-mentioned problem, correction must be performed in such a manner that the foregoing change is canceled and the upward change in the lighting direction can be prevented. When the vehicle is being turned to the right, the height of the vehicle in the rear left wheel portion is reduced. Therefore, the lighting of the lamp is undesirably controlled to a downward direction from the height plane. To prevent this, correction must be performed in such a manner that the foregoing change is canceled and the downward change in the lighting direction can be prevented. After step S17 has been completed, the operation proceeds to step S20 shown in FIG. 6.

In this embodiment, the control has various modes as steps S12, S15 and S16 to correspond to the degree of the velocity V and the acceleration A.

Figure 7:
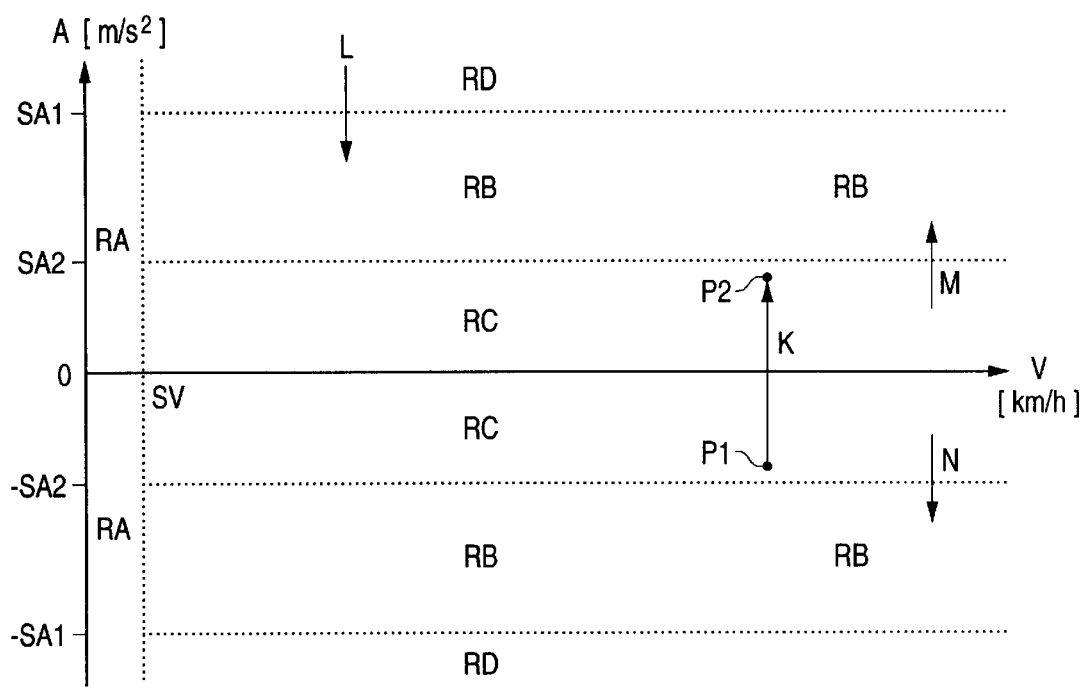

FIG. 7 has axis of abscissa which stands for the velocity V of the vehicle and axis of ordinate which stands for the acceleration A of the vehicle to illustrate an example of a mode map. Referring to FIG. 7, the control described in step S15 is performed in a region (0≦V≦SV and |A|≦SA1) indicated with symbols RA and a region (SV≦V and SA2≦|A|≦SA1) indicated with symbols RB such that the average process for time T1 is performed. Referring to FIG. 7, the control described in step S16 is performed in a region (SV<V and |A|≦SA2) indicated with symbols RC such that the average process for time T2 is performed. The control described in step S12 is performed in a region (|A|>SA1) indicated with symbols RD such that the real time process (as a substitute for an average value of data about the pitch angle of the vehicle, a process to which sampling data which is obtained in a real time manner is directly reflected) which is the linear control described in step S12 is performed.

The conventional method is structured such that the response of the control is determined in accordance with only the magnitude of the acceleration. In this case, when the state of driving of the vehicle which is a deceleration state (refer to operating point P1 (v1, a1)) has been changed to an acceleration state (refer to operating point P2 (v2, a2)), relatively great change (=a2−a1 where a1<0) in the acceleration is shown. Since the degrees |a1| and |a2| of the acceleration is included in the region RC, the control of the lighting direction by performing the average process for time T2 is undesirably carried out. In this case, there is apprehension that the response of the control deteriorates (control is delayed).

On the other hand, this embodiment is structured to detect the change rate of the acceleration in step S10 so that a determination is made when occurrence of the change in the state of driving of the vehicle from point P1 to point P2 means a fact that the change rate (a2−a1) of acceleration with respect to time is great. Thus, the operation proceeds to step S12. Therefore, the control of the lighting direction is performed by carrying out the real time process. Therefore, if points P1 and P2 are included in the region RC, the response of the control is quickened with respect to the change in the acceleration. Therefore, any delay in the control can be prevented.

In step S18 shown in FIG. 6 whether or not transition between the control modes has occurred (refer to, for example, arrows L, M and N shown in FIG. 7) is determined. If an affirmative determination is made, the operation proceeds to step S19. Thus, the foregoing linear process is performed such that the irradiation angles of the head lamps 13 and 13' have a linear relationship with the pitch angle for predetermined time T3 (for example, one second). Then, the operation proceeds to step S20 (when transition of the mode is performed, all data items are updated with an average value for time T3). When the transition of the mode is not performed, the operation directly proceeds to step S20.

In step S20 the ECU 8 calculates data for the operation to be supplied to the actuator portions 12 and 12' in accordance with control data obtained in steps S12, S15, S16 and S17. Then, the operation proceeds to step S21 so that whether or not the head-lamp switch 14 has been switched on is determined. If the head-lamp switch 14 is switched on, the operation proceeds to step S22. Thus, a signal corresponding to data for the operation is transmitted to each of the actuator portions 12 and 12' to control the lighting direction of the head lamps 13 and 13'. Then, the operation is returned to step S4 shown in FIG. 4. If the head-lamp switch 14 is not switched on, any operation is not performed. Then, the operation is returned to step S4 shown in FIG. 4.

Figure 8:
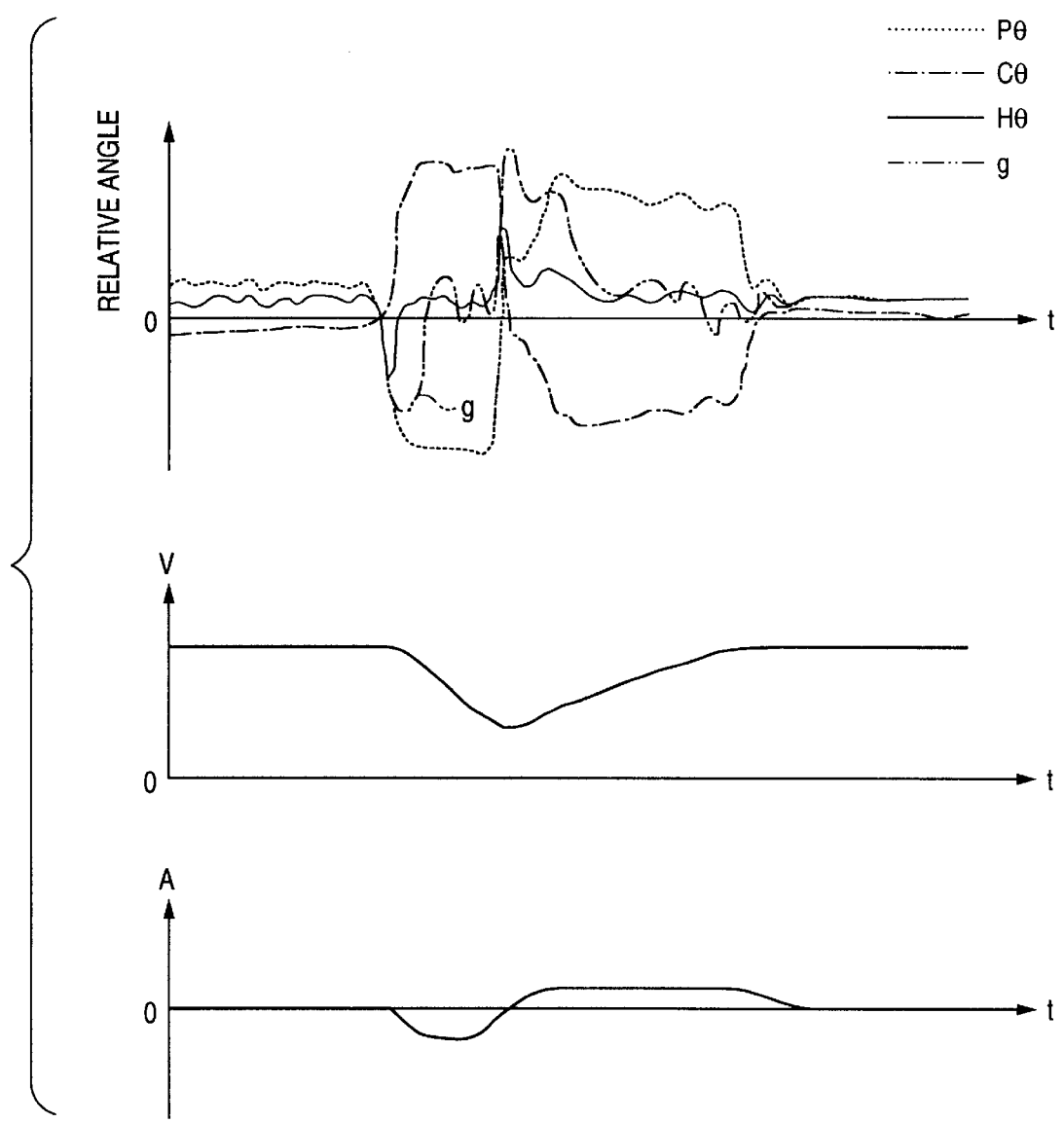

FIG. 8 is a graph schematically showing an example of the control. A graph having the axis of abscissa which stands for time t and the axis of ordinate which stands for pitch angles (indicated with a dashed line) P of the vehicle, control angles (correction angles) C (indicated with an alternate long and short dash line) and heights H of cut lines (indicated with a solid line) (the axis of ordinate expresses relative angles defined by using the angle of a reference plane which is somewhat downwards inclined in the forward direction (in a direction in which the vehicle runs) with respect to a horizontal plane which is made to be 0°). Moreover, graphs indicating change in velocities V and accelerations A with time are shown in the lower portions.

A negative correlation is shown between P and C, while H is considerably changed in a portion in which the acceleration A is greatly changed. A fact can be recognized that a state in which vibrations and excessive change (overshoot or the like) of H in the period of time in which the change is shifted can be prevented (change in H occurring under the conventional control is indicated with an alternate lone and two dashes line g for comparison).

In the foregoing embodiment, the method is employed with which the second order differentiation (differential operation to be exact) is calculated in response to the vehicle detection obtained from the vehicle-velocity sensor 10 to calculate the change rate of acceleration with respect to time. When the method with which the change rate of the attitude of the velocity or the velocity of the change in the pitch angle is employed, a structure as shown in FIG. 3 is employed in which an acceleration sensor 17 or an angular velocity sensor 18 is provided to permit transmission of their detection signal to the ECU 8. When a reference to the degree of opening of the accelerator or force applied to the brake pedal is made, a variety of sensors required to obtain the foregoing information items are, as a matter of course, provided.

As described above, the aspect of the present invention claimed in claim 1 is structured such that the control response of the lighting direction is changed in accordance with the change rate of acceleration with respect to time in the direction in which a vehicle runs. Thus, frequency of occurrence of dazzling light caused from determination of the response of the control with the degree of the acceleration can be reduced. Therefore, the control of the lighting direction can appropriately be performed.

According to the aspect of the present invention claimed in claim 2, when the change rate of acceleration with respect to time is high, the response of the control is quickened. When the change rate of acceleration with respect to time is low, the response of the control is slowed. Thus, glare caused from delay in the control can be prevented. Therefore, if the degree of the acceleration is low despite great change of the same, the lighting direction of the lamp can be controlled without any delay in the control.

According to the aspect of the present invention claimed in claim 3, the detecting means for detecting the change rate of acceleration of the vehicle with respect to time in the direction in which the vehicle runs or the change rate of the attitude of running of the vehicle is provided. In accordance with information about the detection, the control response is changed so that the control of the lighting direction is appropriately performed without any complex structure and excessive enlargement of the cost.

What is claimed is:

1. A lighting-direction control unit for a vehicle lamp structured to detect change in a height of an axle of at least one of a front wheel and an axle of a rear wheel of a vehicle to change a lighting direction of the vehicle lamp in accordance with change in the attitude of the vehicle, said lighting-direction control unit comprising:

detecting means for detecting change in the acceleration in a running direction or change in the attitude of the running vehicle; and lighting control means for obtaining from the detecting means one of a change rate of acceleration in a running direction of the vehicle as it runs with respect to time and a change rate of attitude of the running vehicle with respect to time to change a control response of the lighting direction of said lamp in accordance with the degree of said change rate.

2. A lighting-direction control unit for a vehicle lamp structured to detect change in a height of an axle of at least one of a front wheel and an axle of a rear wheel of a vehicle to change a lighting direction of the vehicle lamp in accordance with change in the attitude of the vehicle, said lighting-direction control unit comprising:

lighting control means for obtaining a change rate of acceleration in a running direction of the vehicle runs with respect to time to change a control response of the lighting direction of said lamp in accordance with the degree of said change rate, wherein said lighting control means performs control to quicken the control response when the change of rate of acceleration is high, and to lower the response of the control when the change rate of acceleration with respect to time is low.

3. A lighting-direction control unit according to claim 2, further comprising:

detecting means for detecting change in the acceleration in a running direction or change in the attitude of the running vehicle, wherein said lighting control means calculates one of change rate of acceleration with respect to time and change rate of the attitude of the running vehicle with respect to time obtained by said detecting means to change the response of the control of the lighting direction of said lamp.

4. A lighting-direction control unit for a vehicle lamp comprising:

a vehicle attitude detector which detects an attitude of a running vehicle;

an acceleration change rate detector which detects a change rate of acceleration of a running vehicle with respect to time;

lighting control means which controls a lighting direction in accordance with an attitude of the running vehicle, and adjusts a response of a lighting direction control in accordance with the change rate of acceleration.

5. A lighting-direction control unit for a vehicle lamp comprising:

a vehicle attitude detector which detects an attitude of a running vehicle;

an acceleration change rate detector which detects a change rate of acceleration of a running vehicle with respect to time;

lighting control means which controls a lighting direction in accordance with an attitude of the running vehicle, and adjusts a response of a lighting direction control in accordance with the change rate of acceleration to quicken the control response when the change rate of acceleration is high, and to lower the response of the control when the change rate of acceleration with respect to time is low.

6. A lightning-direction control unit according to claim 4, wherein a pitch angle of the vehicle is obtained in response to a signal representing the height of the vehicle, and said lightning control means changes the lighting direction in accordance with change in the attitude in a longitudinal direction of the vehicle.

7. A lightning-direction control unit according to claim 4, wherein said acceleration change rate is obtained by first order time differentiation of a signal indicating an acceleration of the running vehicle or second order time differentiation of a signal indicating a velocity of the running vehicle.

8. A lightning-direction control unit according to claim 4, wherein said acceleration change rate is obtained from indirect information obtained as change in the attitude of the vehicle.

9. A lightning-direction control unit according to claim 4, wherein said acceleration change rate is obtained from information about driver's driving operations.

10. A lighting-direction control method for controlling a lighting direction of a vehicle lamp, comprising the steps of:

detecting an attitude of a running vehicle;

detecting a change rate of acceleration of a running vehicle with respect to time;

controling a lighting direction in accordance with the attitude of the running vehicle; and adjusting a response of a lighting direction control in accordance with the change rate of acceleration.

11. A lighting-direction control method for controlling a lighting direction of a vehicle lamp, comprising:

detecting an attitude of a running vehicle;

detecting a change rate of acceleration of a running vehicle with respect to time;

controlling a lighting direction in accordance with the attitude of the running vehicle; and adjusting a response of a lighting direction control in accordance with the change rate of acceleration wherein the control response is quickened when the change rate of acceleration is high, and the control response is lowered when the change rate of acceleration with respect to time is low.

* * * * *